(12) United States Patent
Kim et al.

(10) Patent No.: US 9,905,842 B2
(45) Date of Patent: Feb. 27, 2018

(54) NEGATIVE ACTIVE MATERIAL FOR RECHARGEABLE LITHIUM BATTERY, AND NEGATIVE ELECTRODE AND RECHARGEABLE LITHIUM BATTERY INCLUDING SAME

(71) Applicant: Samsung SDI Co., Ltd., Yongin, Gyeonggi-Do (KR)

(72) Inventors: Bong-Chull Kim, Yongin (KR); Jae-Hou Nah, Yongin (KR); Joon-Sup Kim, Yongin (KR); Kyeong-Min Jeong, Yongin (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 427 days.

(21) Appl. No.: 13/800,382

(22) Filed: Mar. 13, 2013

(65) Prior Publication Data

US 2014/0050983 A1    Feb. 20, 2014

(30) Foreign Application Priority Data

Aug. 14, 2012 (KR) .......... 10-2012-0089138

(51) Int. Cl.
*H01M 4/133* (2010.01)
*H01M 4/04* (2006.01)
*H01M 4/36* (2006.01)
*H01M 4/131* (2010.01)
(Continued)

(52) U.S. Cl.
CPC ......... *H01M 4/133* (2013.01); *H01M 4/0471* (2013.01); *H01M 4/131* (2013.01); *H01M 4/364* (2013.01); *H01M 4/366* (2013.01); *H01M 4/485* (2013.01); *H01M 4/587* (2013.01)

(58) Field of Classification Search
CPC ... Y02E 60/122; H01M 4/134; H01M 4/1395; H01M 4/483; H01M 4/133; H01M 4/364; H01M 4/131; H01M 4/0471; H01M 4/366; H01M 4/587; H01M 4/485
See application file for complete search history.

(56) References Cited

U.S. PATENT DOCUMENTS

2002/0009646 A1* 1/2002 Matsubara et al. ........ 429/231.8
2002/0076614 A1* 6/2002 Yoon et al. .............. 429/231.95
(Continued)

FOREIGN PATENT DOCUMENTS

CN  1335651 A  2/2002
CN  1428880 A  7/2003
(Continued)

OTHER PUBLICATIONS

English machine translation of Umeno JP2005-149946.*
(Continued)

*Primary Examiner* — Lisa S Park
(74) *Attorney, Agent, or Firm* — Knobbe, Martens, Olson & Bear, LLP

(57) ABSTRACT

In an aspect, a negative active material for a rechargeable lithium battery that includes a silicon-based active material including a core including carbon and $SiO_x$ particles ($0.5 \leq x \leq 1.5$); and a coating layer surrounding the core, and a negative electrode and a rechargeable lithium battery including the same are provided.

16 Claims, 3 Drawing Sheets

(51) Int. Cl.
 *H01M 4/485* (2010.01)
 *H01M 4/587* (2010.01)

(56) References Cited

U.S. PATENT DOCUMENTS

| | | | | |
|---|---|---|---|---|
| 2003/0118905 | A1* | 6/2003 | Fukuoka | C09C 1/3045 |
| | | | | 429/218.1 |
| 2005/0074672 | A1* | 4/2005 | Matsubara et al. | 429/231.95 |
| 2005/0233213 | A1* | 10/2005 | Lee | H01M 4/13 |
| | | | | 429/218.1 |
| 2006/0166098 | A1 | 7/2006 | Tabuchi et al. | |
| 2007/0224508 | A1* | 9/2007 | Aramata | H01M 4/134 |
| | | | | 429/231.95 |
| 2009/0047577 | A1 | 2/2009 | Iwamoto et al. | |
| 2009/0269669 | A1 | 10/2009 | Kim et al. | |
| 2011/0086271 | A1* | 4/2011 | Lee et al. | 429/220 |
| 2011/0195313 | A1 | 8/2011 | Lee et al. | |
| 2011/0281180 | A1 | 11/2011 | Kim et al. | |
| 2012/0115033 | A1 | 5/2012 | Kim et al. | |

FOREIGN PATENT DOCUMENTS

| | | |
|---|---|---|
| CN | 101572312 A | 11/2009 |
| CN | 102044670 A | 5/2011 |
| CN | 102187498 A | 9/2011 |
| CN | 102244251 A | 11/2011 |
| CN | 102468483 A | 5/2012 |
| EP | 2 104 175 A2 | 9/2009 |
| EP | 2 113 955 A1 | 11/2009 |
| EP | 2 323 203 A1 | 5/2011 |
| EP | 2 387 089 A1 | 11/2011 |
| EP | 2 450 986 A1 | 5/2012 |
| JP | 2005-149946 A | 6/2005 |
| KR | 10-2005-0115480 A | 12/2005 |
| KR | 10-2008-0074157 A | 8/2008 |
| KR | 10-2009-0034045 A | 4/2009 |
| KR | 10-1126202 B1 | 3/2012 |
| WO | WO 2010/041907 A2 | 4/2010 |

OTHER PUBLICATIONS

Huang et al., "Carbon-coated silicon nanowire array films for high-performance lithium-ion battery anodes," *Appl. Phys. Lett.* 95, (2009) 133119-1-133119-3.

Yao et al., "Interconnected Silicon Hollow Nanospheres for Lithium-Ion Battery Anodes with Long Cycle Life," *Am. Chem. Soc., Nano Lett.* 2011, 11, 2949-2954.

European Extended Search Report dated Nov. 11, 2013 for European Patent Application No. EP 13 170 104.7 which shares priority of Korean Patent Application No. KR 10-2012-0089138 with captioned U.S. Appl. No. 13/800,382.

Jeong et al., "Multifunctional $TiO_2$ coating for a SiO anode in Li-ion batteries," *J. Mater. Chem.*, 2012, 22, pp. 7999-8004.

Korean Office Action dated Jan. 30, 2016 for Korean Patent Application No. KR 10-2012-0089138 which corresponds to subject U.S. Appl. No. 13/800,382.

Chinese Office Action dated Jul. 6, 2016 for Chinese Patent Application No. CN 201310318395.5, and shares priority of Korean Patent Application No. KR 10-2012-0089138 with subject U.S. Appl. No. 13/800,382.

The Second Chinese Office Action dated Mar. 2, 2017 for Chinese Patent Application No. CN 201310318395.5, which shares priority of Korean Patent Application No. KR 10-2012-0089138 with subject U.S. Appl. No. 13/800,382.

European Examination Report dated Nov. 14, 2017 for European Patent Application No. EP 13 170 104.7, which shares priority of Korean Patent Application No. KR 10-2012-0089138 with subject U.S. Appl. No. 13/800,382. No new references are cited in the EP Report.

Decision of Final Rejection dated Aug. 2, 2017 for Chinese Patent Application No. CN 201310318395.5, which shares priority of Korean Patent Application No. KR 10-2012-0089138 with subjection U.S. Appl. No. 13/800,382. References referred to in the Chinese Final Rejection are already of record in the subject U.S. Application.

* cited by examiner

NEGATIVE ACTIVE MATERIAL FOR RECHARGEABLE LITHIUM BATTERY, AND NEGATIVE ELECTRODE AND RECHARGEABLE LITHIUM BATTERY INCLUDING SAME

CROSS-REFERENCE TO RELATED APPLICATIONS

This application claims priority to and the benefit of Korean Patent Application No. 10-2012-0089138 filed on August 14, 2012 in the Korean Intellectual Property Office, the disclosure of which is incorporated in its entirety herein by reference.

BACKGROUND

Field

This disclosure relates to a negative active material for a rechargeable lithium battery, and a negative electrode and a rechargeable lithium battery including the same.

Description of the Related Technology

Rechargeable lithium batteries have recently drawn attention as a power source for small portable electronic devices. Rechargeable lithium batteries use an organic electrolyte solution and thereby, have twice or more high discharge voltage than conventional batteries using an alkali aqueous solution and may have high energy density.

A rechargeable lithium battery may include a positive electrode including a positive active material being capable of intercalating and deintercalating lithium and a negative electrode including a negative active material being capable of intercalating and deintercalating lithium in a battery cell and an electrolyte solution injected therein.

As for negative active materials of a rechargeable lithium battery, various carbon-based materials such as artificial graphite, natural graphite, and hard carbon may be used.

Recently, non-carbon-based negative active materials such as Si have been investigated to afford stability and high-capacity in rechargeable lithium batteries.

SUMMARY

Some embodiments provide a negative active material for a rechargeable lithium battery having excellent cycle-life characteristics.

Some embodiments provide a negative electrode for a rechargeable lithium battery including the negative active material.

Some embodiments provide a rechargeable lithium battery including the negative electrode.

Some embodiments provide a negative active material for a rechargeable lithium battery that includes a silicon-based active material including a core; and a coating layer surrounding the core, wherein the core comprises crystalline carbon and $SiO_x$ (0.5≤x≤1.5) particles where the $SiO_x$ particles have an average particle diameter of about 0.3 μm to about 5 μm, and wherein the coating layer includes amorphous carbon.

In some embodiments, the $SiO_x$ particles may have an average particle diameter of about 0.5 μm to about 5 μm. In some embodiments, the $SiO_x$ particles may have an average particle diameter of about 1 μm to about 5 μm.

In some embodiments, the $SiO_x$ particles and the crystalline carbon may be included in a weight ratio of about 1:1.5 to about 1:19. In some embodiments, the $SiO_x$ particles and the crystalline carbon may be included in a weight ratio of about 1:5 to about 1:19.

In some embodiments, the $SiO_x$ particles may be amorphous.

In some embodiments, the $SiO_x$ particles may be included in an amount of about 5 wt % to about 40 wt % based on the total amount of the negative active material.

In some embodiments, the core may include crystalline carbon; and $SiO_x$ particles disposed on the surface of the crystalline carbon. In some embodiments, the crystalline carbon may include pores, and the $SiO_x$ particles may be disposed on the surface of the crystalline carbon and reside in the pores of the crystalline carbon.

In some embodiments, the core may include the crystalline carbon; and the $SiO_x$ particles dispersed between the crystalline carbon, the crystalline carbon may include pores, and the $SiO_x$ particles may be disposed between the crystalline carbon and reside in the pores of the crystalline carbon.

In some embodiments, the crystalline carbon may be included in an amount of about 45 wt % to about 94 wt % based on the total amount of the negative active material.

In some embodiments, the crystalline carbon may include at least one selected from natural graphite and artificial graphite.

In some embodiments, the core may further include a metal oxide disposed on the surface of the $SiO_x$ particles and represented by the following Chemical Formula 1.

$$M_yO_z \qquad \text{Chemical Formula 1}$$

In Chemical Formula 1,

M may be at least one metal selected from aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), and molybdenum (Mo), 0<y<5 and 0<z<20.

In some embodiments, the coating layer may be included in an amount of about 1 wt % to about 20 wt % based on the total amount of the negative active material.

In some embodiments, the amorphous carbon may include at least one selected from soft carbon, hard carbon, a mesophase pitch carbonized product, and fired coke.

In some embodiments, the coating layer may have a thickness of about 100 nm to about 2000 nm.

In some embodiments, the negative active material may further include a carbon-based active material, and the silicon-based active material and carbon-based active material may be mixed at a weight ratio of about 2.5:97.5 to about 97.5 to 2.5.

According to another embodiment, a negative electrode for a rechargeable lithium battery including the negative active material is provided.

Some embodiments provide, a rechargeable lithium battery including the negative electrode, a positive electrode, and an electrolyte solution is provided.

Hereinafter, further embodiments will be described in the detailed description.

Some embodiments provide a rechargeable lithium battery having excellent cycle-life characteristics may be realized.

DETAILED DESCRIPTION

Exemplary embodiments will hereinafter be described in detail. However, these embodiments are only exemplary, and this disclosure is not limited thereto.

Some embodiments provide a negative active including a silicon-based active material including a core including crystalline carbon and $SiO_x$ (0.5≤x≤1.5) particles; and a coating layer surrounding the core and including amorphous carbon.

Figure 1:
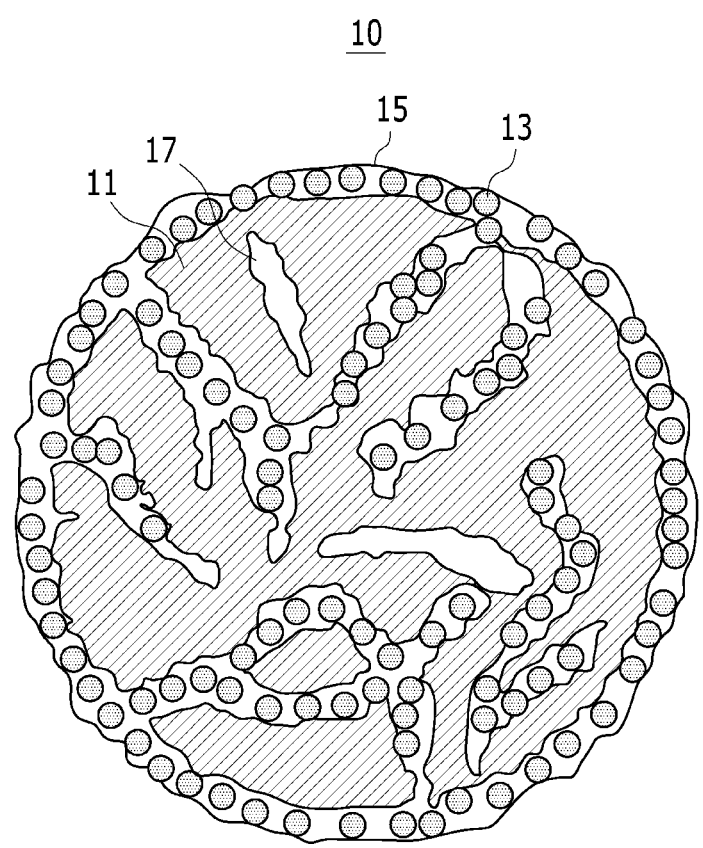
FIG. 1 is a schematic view of a structure of a negative active material according to one embodiment.
Figure 2:
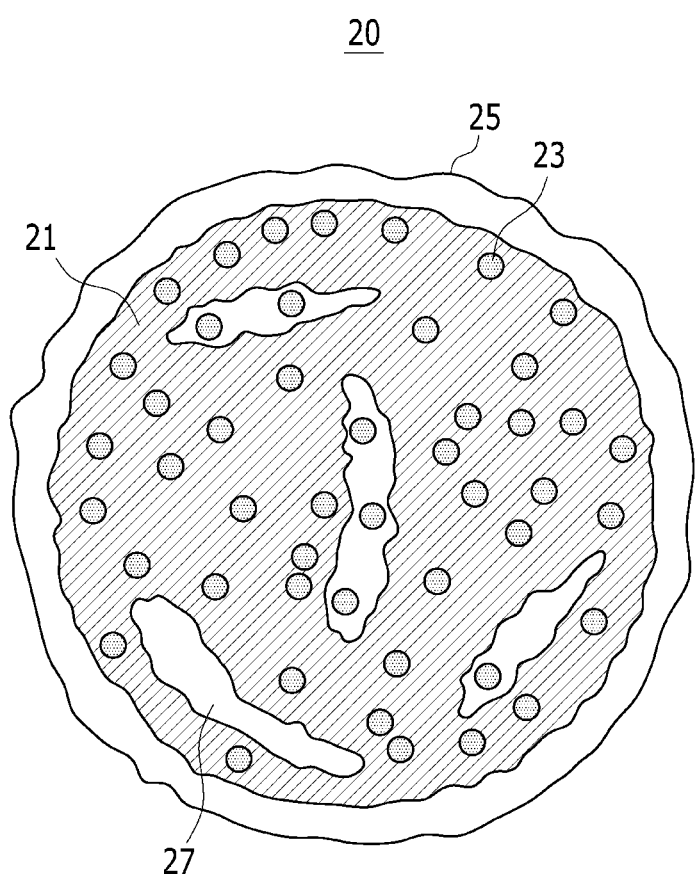
FIG. 2 is a schematic view of a structure of a negative active material according to another embodiment.

In some embodiments, the structure of the negative active material may be as depicted in FIGS. 1 and 2. FIGS. 1 and 2 may show examples of the structure of the negative active material without limitation.

FIG. 1 is a schematic view of a structure of a negative active material according to one embodiment, and FIG. 2 is a schematic view of a structure of a negative active material according to another embodiment.

Referring to FIG. 1, the negative active material 10 may include a core including crystalline carbon 11 and $SiO_x$ particles 13 and a coating layer 15 surrounding the core. In some embodiments, the core may have a structure where the $SiO_x$ particle 13 is positioned on a surface of the crystalline carbon 11.

In some embodiments, the crystalline carbon 11 may have a pore 17 therein. In the case that the crystalline carbon has the pore therein, it may function of buffering for volume expansion of the $SiO_x$ particles during charge and discharge. In some embodiments, the $SiO_x$ particles 13 may be positioned on the surface of the crystalline carbon 11 and reside in the pore 17.

Referring to FIG. 2, the negative active material 20 may include a core including the crystalline carbon 21 and $SiO_x$ particles 23 and a coating layer 25 surrounding the core. In some embodiments, the core may have a structure where the $SiO_x$ particles 23 are dispersed throughout the crystalline carbon 21.

In some embodiments, the crystalline carbon 21 may have a pore 27 therein. In the case that the crystalline carbon has the pore therein, it may function of buffering for volume expansion of the $SiO_x$ particle during charge and discharge. In some embodiments, the $SiO_x$ particle 23 may be positioned on the surface of the crystalline carbon 21 and reside in the pore 27.

In some embodiments, the crystalline carbon may function of buffering for volume expansion of the $SiO_x$ particles during charge and discharge, and provide excellent electrical conductivity.

In some embodiments, the crystalline carbon may include at least one selected from natural graphite and artificial graphite.

In some embodiments, the crystalline carbon may be included in an amount of about 45 wt % to about 94 wt % based on the total amount of the negative active material including the core and the coating layer including the core and the coating layer. In some embodiments, the crystalline carbon may be included in an amount of about 65 to about 85 wt % based on the total amount of the negative active material including the core and the coating layer. When the crystalline carbon is include within any of the above ranges, buffering effect for volume expansion of the $SiO_x$ particle increases, and excellent electrical conductivity may be provided.

In some embodiments, the $SiO_x$ particle may be amorphous, or may be disproportionate $SiO_x$ including silicon crystal due to disproportionation reaction. When the $SiO_x$ particle is amorphous, it may show excellent cycle-life characteristics rather than the disproportionate $SiO_x$.

In some embodiments, x ranges from about 0.5 to about 1.5 in the $SiO_x$ particles. When x is within the above range, a rechargeable lithium battery having improved cycle-life characteristics and a high capacity increase ratio of an active material per unit weight may be realized.

In some embodiments, the $SiO_x$ particle may have average particle diameter of about 0.3 μm to about 5 μm. In some embodiments, the $SiO_x$ particle may have average particle diameter of about 0.5 μm to about 5 μm. In some embodiments, the $SiO_x$ particle may have average particle diameter of about 1 μm to about 5 μm average particle diameter. When the $SiO_x$ particle has an average particle diameter within any of the above ranges, volume expansion may be suppressed during charge and discharge and cycle-life may be improved.

In some embodiments, the core may include the $SiO_x$ particles and the crystalline carbon in a weight ratio of about 1:1.5 to about 1:19. In some embodiments, the core may include the $SiO_x$ particles and the crystalline carbon in a weight ratio of about 1:5 to about 1:19. In some embodiments, the core may include the $SiO_x$ particles and the crystalline carbon in a weight ratio of about 1:8 to about 1:19. Within any of the above weight ratio ranges, a buffering effect for volume expansion of the $SiO_x$ particle may increase, excellent electrical conductivity may be provided, and cycle-life may be improved.

In some embodiments, the $SiO_x$ particles may be included in an amount of about 5 wt % to about 40 wt % based on the total amount of the negative active material including the core and the coating layer. In some embodiments, the $SiO_x$ particles may be included in an amount of about 5 wt % to about 30 wt % based on the total amount of the negative active material including the core and the coating layer. When the $SiO_x$ particle is included within any of the above ranges, volume expansion may be suppressed during charge and discharge and cycle-life may be improved.

In some embodiments, the core may further include a metal oxide disposed on the surface of the $SiO_x$ particle and represented by the following Chemical Formula 1.

$M_yO_z$  Chemical Formula 1

In Chemical Formula 1,

M may be a metal including aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), molybdenum (Mo), or a combination thereof, 0<y<5 and 0<z<20.

When the metal oxide is disposed on the surface of the $SiO_x$ particle, thermal stability and cycle-life characteristics of a negative active material may be further improved. In some embodiments, M may be aluminum (Al), titanium (Ti), magnesium (Mg), zirconium (Zr), or a combination thereof.

In some embodiments, the coating layer may surround both the crystalline carbon and $SiO_x$ particle allowing the $SiO_x$ particles to be attached to the surface of the crystalline carbon strongly. In some embodiments, the coating layer may have the function of buffering for volume expansion of the $SiO_x$ particle during charge and discharge along with the crystalline carbon, and thus improve cycle-life characteristics.

In some embodiments, the amorphous carbon of the coating layer may include at least one selected from soft carbon, hard carbon, a mesophase pitch carbonized product, and fired cokes.

In some embodiments, the coating layer may have a thickness of about 100 nm to about 2000 nm. When the coating layer has a thickness within the above range, excellent buffering for volume expansion of the $SiO_x$ particle may be provided.

In some embodiments, the coating layer may be included in an amount of about 1 wt % to about 20 wt % based on the total amount of the negative active material including the core and coating layer. In some embodiments, the coating layer may be included in an amount of about 5 to about 20 wt % based on the total amount of the negative active material including the core and coating layer. When the coating layer is included within any of the above ranges, excellent buffering for volume expansion of the $SiO_x$ particle may be provided.

In some embodiments, the negative active material having a structure of FIG. 1 may be prepared according to the following processes.

First, about 5 wt % to about 40 wt % of the $SiO_x$ particles having average particle diameter of about 0.3 μm to about 5 μm, and about 45 wt % to about 94 wt % of the crystalline carbon are mixed in a solvent, and a structure where the $SiO_x$ particle is positioned on the surface of the crystalline carbon is obtained. In some embodiments, the crystalline carbon may be obtained by spherically shaping. Alternatively, $SiO_x$ may be added to the spherically shaping of the crystalline carbon, and mixed therewith. In some embodiments, the solvent may include at least one selected from benzene, ethanol, and methanol.

Then, about 1 wt % to about 20 wt % of a precursor of the amorphous carbon is added to the resultant mixture in a solvent or without using a solvent and heat treatment is performed. In some embodiments, the precursor of the amorphous carbon may include coal pitch, mesophase pitch, petroleum pitch, coal oil, petroleum heavy oil, and the like, or a polymer resin such as a phenolic resin, a furan resin, a polyimide resin, and the like. In some embodiments, the solvent may include at least one selected from benzene, ethanol, and methanol.

Herein, the amounts of the $SiO_x$ particle, the crystalline carbon, and the precursor of amorphous carbon are based on the total sum thereof.

In some embodiments, the heat treatment may be performed at about 600° C. to about 1100° C. In some embodiments, the heat treatment may be performed at about 750° C. to about 850° C., under an atmosphere such as $N_2$ or Ar, for about 0.5 hour to about 4 hours. Depending on the heat treatment temperature, amorphous $SiO_x$ may be maintained, or disproportionate $SiO_x$ particle may be formed wherein silicon crystal is formed through a disproportionation reaction. Such formation of a particle may be confirmed through a silicon (Si) peak of XRD. Depending on the heat treatment temperature and under the above conditions, the precursor of the amorphous carbon may be carbonized converting into amorphous carbon, and both the crystalline carbon the $SiO_x$ particles may be surrounded to form a coating layer.

In some embodiments, a negative active material having a structure of FIG. 2 may be prepared by adding the $SiO_x$ particles during spherically shaping of the crystalline carbon.

Hereinafter, a rechargeable lithium battery including the negative active material is described referring to FIG. 3.

Figure 3:
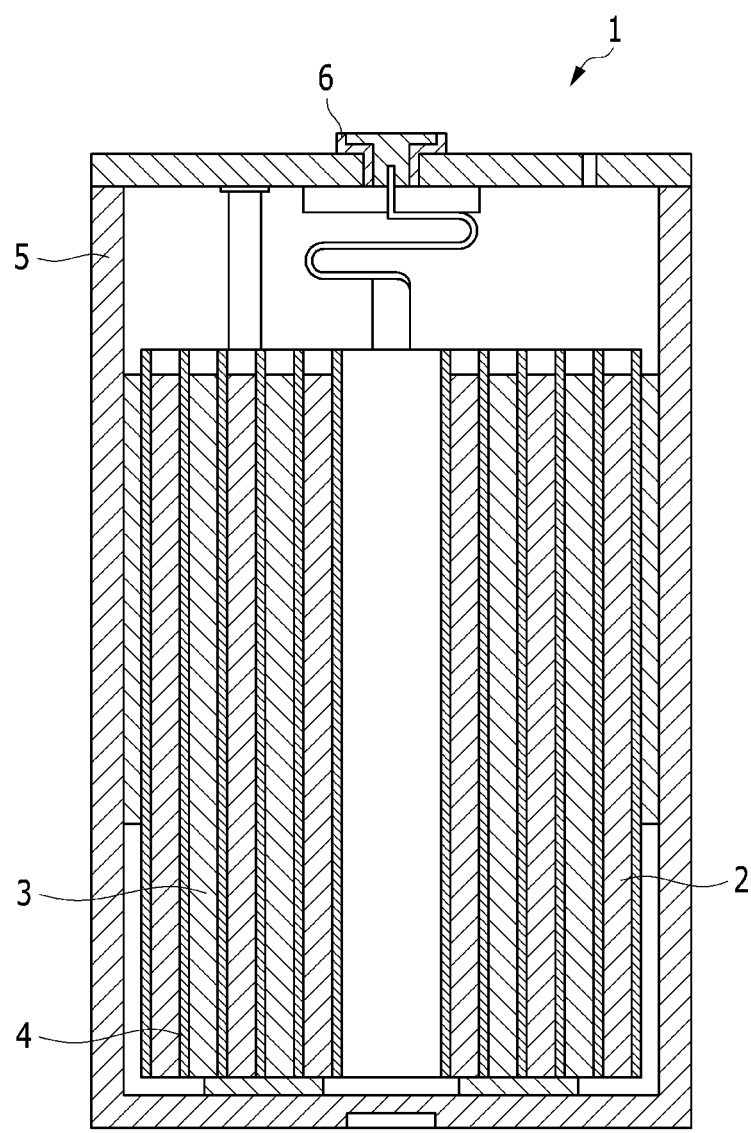
FIG. 3 is an exploded perspective view of a rechargeable lithium battery according to one embodiment.

FIG. 3 is an exploded perspective view of a rechargeable lithium battery according to one embodiment.

Referring to FIG. 3, the rechargeable lithium battery 1 may be a prismatic battery that includes an electrode assembly including a positive electrode 2, a negative electrode 3, and a separator 4 between the positive electrode 2 and negative electrode 3, in a battery case 5, and an electrolyte solution injected through an upper part of the battery case 5, and a cap plate 6 sealing them. The rechargeable lithium battery according to one embodiment is not limited to the prismatic battery. In some embodiments, the a battery including the negative active material for a rechargeable lithium battery as disclosed herein may be a cylindrical, coin-type, pouch-type battery, and the like without limitation.

In some embodiments, the negative electrode may include a negative current collector and a negative active material layer disposed thereon, and the negative active material layer may include a negative active material. In some embodiments, the negative active material may be included in an amount of about 80 wt % to about 99 wt % based on the total weight of the negative active material layer.

In some embodiments, the negative active material may be the above described negative active material, and specifically a silicon-based active material, or a mixture of the described silicon-based active material and a generally-used carbon-based active material that is generally in a rechargeable lithium battery. In some embodiments, the silicon-based active material and the carbon-based active material may be mixed in a weight ratio of about 2.5:97.5 to about 97.5 to 2.5.

In some embodiments, the carbon-based active material may be any generally-used carbon-based active material in a lithium ion rechargeable battery. Examples of the carbon material include crystalline carbon, amorphous carbon, and mixtures thereof. In some embodiments, the crystalline carbon may be non-shaped, or sheet, flake, spherical, or fiber shaped natural graphite or artificial graphite. In some embodiments, the amorphous carbon may be a soft carbon, a hard carbon, a mesophase pitch carbonization product, fired coke, and the like.

When used as the carbon-based active material, a carbon-based active material having less volume changes during charge and discharge, for example graphite, electrical conductive path due to volume changes of the $SiO_x$ particle volume in the silicon-based active material in an electrode plate during charge and discharge may be secured more advantageously.

In some embodiments, the negative active material layer may include a binder, and optionally a conductive material. The binder may be included in an amount of about 1 to about 5 wt % of a binder based on the total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

In some embodiments, the binder may improve binding properties of negative active material particles with one another and with a current collector. In some embodiments, the binder may include a non-water-soluble binder, a water-soluble binder, or a combination thereof.

In some embodiments, the non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

In some embodiments, the water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth) acrylic acid and (meth)acrylic acid alkyl ester, or a combination thereof.

When the water-soluble binder is used as a negative electrode binder, a cellulose-based compound may be further used to provide viscosity. In some embodiments, the cellulose-based compound includes one or more of carboxylmethyl cellulose, hydroxypropylmethyl cellulose, methyl cellulose, or alkali metal salts thereof. In some embodiments, the alkali metal may be Na, K, or Li. In some embodiments, the cellulose-based compound may be included in an amount of about 0.1 to about 50 parts by weight based on 100 parts by weight of the negative active material.

In some embodiments, the conductive material may be included to provide electrode conductivity. Any electrically conductive material may be used as a conductive material unless it causes a chemical change. Examples of the conductive material include carbon-based materials such as natural graphite, artificial graphite, carbon black, acetylene black, ketjen black, carbon fibers, and the like; metal-based materials of metal powder or metal fiber including copper, nickel, aluminum, silver, and the like; conductive polymers such as polyphenylene derivatives; or a mixture thereof.

In some embodiments, the current collector may include one selected from a copper foil, a nickel foil, a stainless steel foil, a titanium foil, nickel foam, copper foam, a polymer substrate coated with a conductive metal, and a combination thereof, but is not limited thereto.

In some embodiments, the positive electrode includes a current collector and a positive active material layer disposed on the current collector. In some embodiments, the positive active material may include a compound that reversibly intercalates and deintercalates lithium (a lithiated intercalation compound). Specifically, a composite oxide of at least one of cobalt, manganese, nickel, or combination thereof, and lithium may be used. Examples may be compounds represented by the following chemical formulae:

$Li_aA_{1-b}X_bD^1_2$ (0.90≤a≤1.8, 0≤b≤0.5);

$Li_aA_{1-b}X_bO_{2-c}D^1_c$ (0.90≤a≤1.8, 0≤b≤0.5, 0≤c≤0.05);

$Li_aE_{1-b}X_bO_{2-c}D^1_c$ (0.90≤a≤1.8, 0≤b≤0.5, 0≤c≤0.05);

$Li_aE_{2-b}X_bO_{4-c}D^1_c$ (0.90≤a≤1.8, 0<b≤0.5, 0≤c≤0.05);

$Li_aNi_{1-b-c}Co_bX_cD^1_\alpha$ (0.90≤a≤1.8, 0≤b≤0.5, 0≤c≤0.05, 0≤α≤2);

$Li_aNi_{1-b-c}Co_bX_cO_{2-\alpha}T_\alpha$ (0.90≤a≤1.8, 0≤b≤0.5, 0≤c≤0.05, 0≤α≤2);

$Li_aNi_{1-b-c}Co_bX_cO_{2-\alpha}T_2$ (0.90≤a≤1.8, 0≤b≤0.5, 0≤c≤0.05, 0≤α≤2);

$Li_aNi_{1-b-c}Mn_bX_cD^1_\alpha$ (0.90≤a≤1.8, 0≤b≤0.5, 0≤c≤0.05, 0≤α≤2);

$Li_aNi_{1-b-c}Mn_bX_cO_{2-\alpha}T_\alpha$ (0.90≤a≤1.8, 0≤b≤0.5, 0≤c≤0.05, 0≤α≤2);

$Li_aNi_{1-b-c}Mn_bX_cO_{2-\alpha}T_2$ (0.90≤a≤1.8, 0≤b≤0.5, 0≤c≤0.05, 0≤α≤2);

$Li_aNi_bE_cG_dO_2$ (0.90≤a≤1.8, 0≤b≤0.9, 0≤c≤0.5, 0.001≤d≤0.1);

$Li_aNi_bCo_cMn_dG_eO_2$ (0.90≤a≤1.8, 0≤b≤0.9, 0≤c≤0.5, 0≤d≤0.5, 0.001≤e≤0.1);

$Li_aNiG_bO_2$ (0.90≤a≤1.8, 0.001≤b≤0.1);

$Li_aCoG_bO_2$ (0.90≤a≤1.8, 0.001≤b≤0.1);

$Li_aMn_{1-b}G_bO_2$ (0.90≤a≤1.8, 0.001≤b≤0.1);

$Li_aMn_2G_bO_4$ (0.90≤a≤1.8, 0.001≤b≤0.1);

$Li_aMn_{1-g}G_gPO_4$ (0.90≤a≤1.8, 0≤g≤0.5);

$QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2);

$Li_{(3-f)}Fe_2(PO_4)_3$ (0≤f≤2); and $LiFePO_4$.

In the above chemical formulae, A is selected from Ni, Co, Mn, and a combination thereof; X is selected from Al, Ni, Co, Mn, Cr, Fe, Mg, Sr, V, a rare earth element, and a combination thereof; $D^1$ is selected from O (oxygen), F (fluorine), S (sulfur), P (phosphorus), and a combination thereof; E is selected from Co, Mn, and a combination thereof; T is selected from F (fluorine), S (sulfur), P (phosphorus), and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

In some embodiments, the compounds may have a coating layer on the surface, or may be mixed with another compound having a coating layer. In some embodiments, the coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. In some embodiments, the compound for the coating layer may be amorphous or crystalline. In some embodiments, the coating element included in the coating layer may include Mg, Al, Co, K, Na, Ca, Si, Ti, V, Sn, Ge, Ga, B, As, Zr, or a mixture thereof. In some embodiments, the coating layer may be disposed in a method having no adverse influence on properties of a positive active material by using these elements in the compound. For example, the method may include any coating method such as spray coating, dipping, and the like, but is not illustrated in more detail since it is well-known to those who work in the related field.

In some embodiments, the positive active material may be included in an amount of about 80 wt % to about 99 wt % based on the total weight of the positive active material layer. The positive active material layer includes a binder and a conductive material. Herein, the binder and conductive material are included in each amount of about 1 wt % to 5 wt % based on the total weight of the positive active material layer.

In some embodiments, the binder may improve binding properties of the positive active material particles to each other and to a current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

In some embodiments, the conductive material provides an electrode with conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material such as metal powder or metal fiber including copper, nickel, aluminum, silver, and the like; a conductive polymer such as polyphenylene derivative, or a mixture thereof.

In some embodiments, the current collector may be an Al foil, but is not limited thereto.

In some embodiments, the negative electrode and positive electrode may be fabricated by a method including mixing an active material, a conductive material, and a binder in a solvent to prepare an active material composition, and coating the active material composition on a current collector, respectively. In some embodiments, the solvent may include N-methylpyrrolidone, and the like, but is not limited thereto. When the negative electrode includes a water-soluble binder, a solvent used for preparing the negative active material composition may be water.

In some embodiments, the electrolyte solution includes a non-aqueous organic solvent and a lithium salt.

In some embodiments, the non-aqueous organic solvent serves as a medium of transmitting ions taking part in the electrochemical reaction of the battery. In some embodiments, the non-aqueous organic solvent may be selected from a carbonate-based, ester-based, ether-based, ketone-based, alcohol-based, or aprotic solvent.

Examples of the carbonate-based solvent may include, for example dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like.

Particularly, when a linear carbonate compound and a cyclic carbonate compound are mixed, a solvent having a high dielectric constant and low viscosity may be provided. The cyclic carbonate compound and linear carbonate compound may be mixed in a volume ratio of about 1:1 to about 1:9.

Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like.

The non-aqueous organic solvent may be used singularly or in a mixture. When the organic solvent is used in a mixture, the mixture ratio can be controlled in accordance with a desirable battery performance.

In addition, non-aqueous organic solvent may further include an aromatic hydrocarbon-based solvent as well as the carbonate-based solvent. The carbonate-based solvents and aromatic hydrocarbon-based solvents may be mixed together in a volume ratio of about 1:1 to about 30:1.

In some embodiments, the aromatic hydrocarbon-based organic solvent may be an aromatic hydrocarbon-based compound represented by the following Chemical Formula 1.

Chemical Formula 1

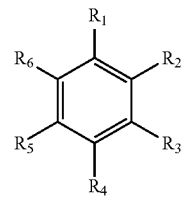

In the above Chemical Formula 1, each $R_1$ to $R_6$ is independently hydrogen, a halogen, a C1 to C10 alkyl, or a C1 to C10 haloalkyl.

In some embodiments, the aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In some embodiments, the non-aqueous organic solvent may further include vinylene carbonate or an ethylene carbonate-based compound represented by the following Chemical Formula 2 to improve cycle life.

Chemical Formula 2

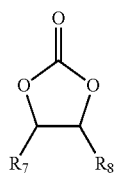

In Chemical Formula 2, $R_7$ and $R_8$ are the same or different and may be each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyano-ethylene carbonate, fluoroethylene carbonate, and the like. The amount of the additive for improving cycle life may be flexibly used within an appropriate range.

In some embodiments, the lithium salt is dissolved in an organic solvent, and supplies a battery with lithium ions, basically operates the rechargeable lithium battery, and improves transportation of the lithium ions between positive and negative electrodes.

Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers of 1 to 20, respectively), LiCl, LiI, and $LiB(C_2O_4)_2$ (lithium bis(oxalato)borate).

In some embodiments, the lithium salt may be used in a concentration ranging from about 0.1 M to about 2.0 M. When the lithium salt is included at the above concentration range, an electrolyte may have optimal electrolyte conductivity and viscosity, and may thus have enhanced performance and effective lithium ion mobility.

In some embodiments, the separator may include any materials commonly used in the conventional lithium battery as long as separating a negative electrode from a positive electrode and providing a transporting passage of lithium ion. In other words, it may have a low resistance to ion transport and an excellent impregnation for electrolyte solution. For example, it may be selected from glass fiber, polyester, polyethylene, polypropylene, polytetrafluoroethylene (PTFE), or a combination thereof. It may have a form of a non-woven fabric or a woven fabric. For example, for the lithium ion battery, polyolefin-based polymer separator such as polyethylene, polypropylene or the like is mainly used. In order to ensure the heat resistance or mechanical strength, a coated separator including a ceramic component or a polymer material may be used. Selectively, it may have a mono-layered or multi-layered structure.

The following examples illustrate the present embodiments in more detail. These examples, however, should not in any sense be interpreted as limiting the scope of the present embodiments.

Preparation of Negative Active Material

EXAMPLE 1

10 wt % of amorphous SiO particles having an average particle diameter of 0.3 μm and 75 wt % of natural graphite were mixed in ethanol and then the ethanol was removed affording a mixture having the SiO particles on the surface of the natural graphite. Next, 15 wt % of coal pitch was added to the mixture. The resulting mixture was heat-treated at 850° C. under a $N_2$ atmosphere for 2 hours, affording a negative active material. The negative active material has a structure of having the SiO particles on the surface of the natural graphite all surrounded with a coating layer made of amorphous carbon.

EXAMPLE 2

A negative active material was prepared according to the same method as Example 1 except for using amorphous SiO particles with an average particle diameter of 0.5 μm.

EXAMPLE 3

A negative active material was prepared according to the same method as Example 1 except for using amorphous SiO particles with an average particle diameter of 1 μm.

EXAMPLE 4

A negative active material was prepared according to the same method as Example 1 except for using amorphous SiO particles with an average particle diameter of 5 μm.

EXAMPLE 5

A negative active material was prepared according to the same method as Example 1 except for using amorphous SiO particles with an average particle diameter of 1 μm and performing the heat treatment at 1050° C.

EXAMPLE 6

A negative active material was prepared according to the same method as Example 1 except for using 20 wt % of amorphous SiO particles having an average particle diameter of 1 μm, 65 wt % of natural graphite, and 15 wt % of coal pitch.

EXAMPLE 7

A negative active material was prepared according to the same method as Example 1 except for using 15 wt % of amorphous SiO particles having an average particle diameter of 1 μm, 75 wt % of natural graphite, and 10 wt % of coal pitch.

EXAMPLE 8

A negative active material was prepared according to the same method as Example 1 except for using 9 wt % of amorphous SiO particles having an average particle diameter of 1 μm, 81 wt % of natural graphite, and 10 wt % of coal pitch.

EXAMPLE 9

A negative active material was prepared according to the same method as Example 1 except for using 5 wt % of amorphous SiO particles with an average particle diameter of 1 μm, 80 wt % of natural graphite, and 15 wt % of coal pitch.

COMPARATIVE EXAMPLE 1

A negative active material was prepared according to the same method as Example 1 except for using Si particles with an average particle diameter of 1 μm.

COMPARATIVE EXAMPLE 2

A negative active material was prepared according to the same method as Example 1 except for using SiO particles with an average particle diameter of 0.05 μm.

COMPARATIVE EXAMPLE 3

A negative active material was prepared according to the same method as Example 1 except for using SiO particles with an average particle diameter of 0.1 μm.

COMPARATIVE EXAMPLE 4

A negative active material was prepared according to the same method as Example 1 except for using SiO particles with an average particle diameter of 10 μm.

COMPARATIVE EXAMPLE 5

A negative active material was prepared according to the same method as Example 1 except for using SiO particles with an average particle diameter of 15 μm.

REFERENCE EXAMPLE 1

A negative active material was prepared according to the same method as Example 1 except for using 35 wt % of SiO particles with an average particle diameter of 1 μm, 35 wt % of natural graphite, and 30 wt % of coal pitch.

REFERENCE EXAMPLE 2

A negative active material was prepared according to the same method as Example 1 except for using 4 wt % of SiO particles with an average particle diameter of 1 μm, 80 wt % of natural graphite, and 16 wt % of coal pitch.

Fabrication of Rechargeable Lithium Battery 97 wt % of each negative active material according to Examples 1 to 9, Comparative Examples 1 to 5, and Reference Examples 1 and 2, 1 wt % of carboxylmethyl cellulose, and 2 wt % of styrene butadiene rubber were mixed in distilled water, preparing slurry. The slurry was coated on a Cu film current collector, dried, and compressed, fabricating a negative electrode.

Then, a positive electrode was fabricated by mixing 96 wt % of a $LiCoO_2$ positive active material, 2 wt % of a polyvinylidene fluoride binder, and 2 wt % of a carbon black conductive material in N-methyl pyrrolidone to prepare positive active material slurry and then, coating the slurry on an Al film current collector and drying and compressing it.

The negative electrode, the positive electrode, and an electrolyte solution were used to fabricate a prismatic battery cell. The electrolyte solution was prepared by mixing ethylene carbonate (EC), fluoroethylene carbonate (FEC), ethylmethyl carbonate (EMC), and diethylcarbonate (DEC) in a volume ratio of 25:10:40:25 and dissolving 1.15M of $LiPF_6$ therein.

Evaluation 1: Cycle-Life Characteristic of Rechargeable Lithium Battery Cell

Prismatic battery cells fabricated using each negative active material according to Examples 1 to 9, Comparative Examples 1 to 5, and Reference Examples 1 and 2 were charged and discharged under the following condition. The results are provided in the following Table 1.

The battery cells were charged with 1.5 A up to 4.35V and then, with 50 mA and discharged with 1.5 A down to 2.75V.

In the following Table 1, capacity retention (%) was calculated as a percentage of discharge capacity at 500 cycles related to initial discharge capacity.

TABLE 1

| | Average particle diameter (μm) of SiO particles | Weight ratio of SiO particles and natural graphite | Capacity retention (%) |
|---|---|---|---|
| Example 1 | 0.3 | 1:7.5 | 79 |
| Example 2 | 0.5 | 1:7.5 | 81 |
| Example 3 | 1 | 1:7.5 | 80 |
| Example 4 | 5 | 1:7.5 | 83 |
| Example 5 | 1 | 1:7.5 | 77 |
| Example 6 | 1 | 1:3.25 | 70 |
| Example 7 | 1 | 1:5 | 78 |
| Example 8 | 1 | 1:9 | 85 |
| Example 9 | 1 | 1:16 | 88 |
| Comparative Example 1 | 1 (Average particle diameter (μm) of Si particles) | 1:7.5 (Weight ratio of Si particles and natural graphite) | 55 |
| Comparative Example 2 | 0.05 | 1:7.5 | 60 |
| Comparative Example 3 | 0.1 | 1:7.5 | 65 |
| Comparative Example 4 | 10 | 1:7.5 | 60 |
| Comparative Example 5 | 15 | 1:7.5 | 65 |
| Reference Example 1 | 1 | 1:1 | 67 |
| Reference Example 2 | 1 | 1:20 | 80 |

Referring to Table 1, the rechargeable lithium battery cells fabricated using each negative active material including $SiO_x$ particles with an average particle diameter of about 0.3 μm to about 5 μm according to Examples 1 to 9 had excellent cycle-life characteristic compared with the rechargeable lithium battery cells fabricated using each negative active material including $SiO_x$ particles outside of the average particle diameter according to Comparative Examples 2 to 5. The rechargeable lithium battery cell using Si particles instead of the $SiO_x$ particles according to Comparative Example 1 had deteriorated cycle-life characteristic. Accordingly, a volume expansion due to the $SiO_x$ particles turned out to be effectively suppressed.

In addition, Examples 3 and 6 to 9 using $SiO_x$ particles having the same average particle diameter had a bigger ratio difference between $SiO_x$ particles and crystalline carbon (natural graphite) within the weight ratio range of 1:1.5 to 1:19 and superior cycle-life characteristics.

Furthermore, Examples 3 and 5 used SiO particles having the same average particle diameter, but Example 3 using amorphous $SiO_x$ particles had better cycle-life characteristic than Example 5 using $SiO_x$ particles having silicon crystals On the other hand, Reference Example 1 included $SiO_x$ particles and crystalline carbon in a weight ratio of less than 1:1.5 and had a somewhat deteriorated cycle-life characteristic compared with Examples 3 and 6 to 9. The reason is that the crystalline carbon (natural graphite) did not effectively suppress expansion stress of the $SiO_x$ particles and maintain electric conductivity passage.

In addition, Reference Example 2 using the $SiO_x$ particles and the crystalline carbon in a weight ratio of greater than 1:19 maintained cycle-life. However, the amount of $SiO_x$ particles having higher capacity than the crystalline carbon is very small, thus the increases in the capacity using the $SiO_x$ particles cannot be expected.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative active material for a rechargeable lithium battery, comprising
a silicon-based active material including a core; and
a coating layer surrounding the core,
wherein the core consists of crystalline carbon and $SiO_x$ particles (0.5≤x≤1.5) where the $SiO_x$ particles have an average particle diameter of 0.3 μm to 5 μm and are disposed on a surface of the crystalline carbon,
wherein the $SiO_x$ particles to crystalline carbon weight ratio is from 1:1.5 to 1:9;
wherein the $SiO_x$ particles are amorphous;
and wherein the coating layer comprises amorphous carbon.

2. The negative active material for a rechargeable lithium battery of claim 1, wherein the $SiO_x$ particles have an average particle diameter of 0.5 μm to 5 μm.

3. The negative active material for a rechargeable lithium battery of claim 1, wherein the $SiO_x$ particles has an average particle diameter of 1 μm to 5 μm.

4. The negative active material for a rechargeable lithium battery of claim 1, wherein the $SiO_x$ particles are included in an amount of 5 wt % to 40 wt % based on the total amount of the negative active material.

5. The negative active material for a rechargeable lithium battery of claim 1, wherein the crystalline carbon comprises pores.

6. The negative active material for a rechargeable lithium battery of claim 5, wherein the $SiO_x$ particles are disposed on the surface of the crystalline carbon and reside in the pores of the crystalline carbon.

7. The negative active material for a rechargeable lithium battery of claim 1, wherein the core consists of
the crystalline carbon; and
the $SiO_x$ particles are dispersed between the crystalline carbon.

8. The negative active material for a rechargeable lithium battery of claim 7, wherein the crystalline carbon comprises pores, and the $SiO_x$ particles are disposed on the surface of the crystalline carbon and reside in the pores of the crystalline carbon.

9. The negative active material for a rechargeable lithium battery of claim 1, wherein the crystalline carbon is included in an amount of 45 wt % to 94 wt % based on the total amount of the negative active material.

10. The negative active material for a rechargeable lithium battery of claim 1, wherein the crystalline carbon comprise at least one selected from natural graphite and artificial graphite.

11. The negative active material for a rechargeable lithium battery of claim 1, wherein the coating layer is included in an amount of 1 wt % to 20 wt % based on the total amount of the negative active material.

12. The negative active material for a rechargeable lithium battery of claim 1, wherein the amorphous carbon is at least one selected from soft carbon, hard carbon, a mesophase pitch carbonized product, and fired coke.

13. The negative active material for a rechargeable lithium battery of claim 1, wherein the coating layer has a thickness of 100 nm to 2000 nm.

14. The negative active material for a rechargeable lithium battery of claim 1, wherein the negative active material further comprises a carbon-based active material, and the silicon-based active material and carbon-based active material are mixed at a weight ratio of 2.5:97.5 to 97.5 to 2.5.

15. A negative electrode for a rechargeable lithium battery comprising the negative active material of claim 1; and a current collector.

16. A rechargeable lithium battery, comprising:
the negative electrode according to claim 15;
a positive electrode; and
an electrolyte solution.

* * * * *